United States Patent
Hanley et al.

[11] Patent Number: 6,109,021
[45] Date of Patent: Aug. 29, 2000

[54] VECTORING NOZZLE CALIBRATION

[75] Inventors: Charles F. Hanley, Liberty Township; David J. Markstein, Cincinnati, both of Ohio

[73] Assignee: General Electric Company, Cincininnati, Ohio

[21] Appl. No.: 09/120,358

[22] Filed: Jul. 22, 1998

[51] Int. Cl.[7] .................................................. F02K 1/12
[52] U.S. Cl. ..................... 60/204; 60/232; 239/265.35; 239/265.39; 91/171
[58] Field of Search ........................... 60/204, 230, 232; 239/265.35, 265.37, 265.39, 265.41, 265.33; 91/171, 170 MP

[56] References Cited

U.S. PATENT DOCUMENTS

| | | | |
|---|---|---|---|
| 3,351,888 | 11/1967 | Taylor et al. | 239/127.3 |
| 3,438,306 | 4/1969 | Kazmarek | 91/171 |
| 4,994,660 | 2/1991 | Hauer | 239/265.41 |
| 5,076,496 | 12/1991 | Lippmeier | 239/239.41 |
| 5,129,310 | 7/1992 | Ma | 91/171 |
| 5,150,839 | 9/1992 | Reedy | 239/265.41 |
| 5,174,502 | 12/1992 | Lippmeier et al. | 239/265.41 |
| 5,261,605 | 11/1993 | McLafferty et al. | 239/265.35 |
| 5,267,436 | 12/1993 | Wood, Jr. et al. | 60/204 |
| 5,269,467 | 12/1993 | Williams et al. | 239/265.41 |
| 5,379,585 | 1/1995 | Snow et al. | 60/204 |
| 5,437,411 | 8/1995 | Renggli | 239/265.39 |
| 5,442,909 | 8/1995 | Snow et al. | 60/204 |
| 5,484,105 | 1/1996 | Avsdenmoore et al. | 239/127.3 |
| 5,485,959 | 1/1996 | Wood et al. | 239/265.41 |
| 5,553,452 | 9/1996 | Snow et al. | 60/327 |
| 5,685,141 | 11/1997 | Markstein et al. | 60/204 |
| 5,740,988 | 4/1998 | Ausdenmoore | 239/265.39 |

FOREIGN PATENT DOCUMENTS

| | | |
|---|---|---|
| 0544764B1 | 11/1995 | European Pat. Off. . |
| 0704615A2 | 4/1996 | European Pat. Off. . |
| 0723075A2 | 9/1996 | European Pat. Off. . |

*Primary Examiner*—Ted Kim
*Attorney, Agent, or Firm*—Andrew C. Hess; Rodney M. Young

[57] ABSTRACT

A method and system are used to calibrate a plurality of actuators joined to an actuation ring in a control system for vectoring exhaust flaps in a vectoring nozzle. The actuators include output rods which are positioned to respective first positions at which output stroke is measured. The actuators are repositioned to different second positions, and the output stroke thereof is again measured. The stroke measurement for each of the actuators is calibrated to effect a common linear response between the first and second measurement positions. The calibrated actuators ensure coordinated linear actuation thereof as the output rods are positioned between their minimum and maximum extensions.

11 Claims, 5 Drawing Sheets

VECTORING NOZZLE CALIBRATION

BACKGROUND OF THE INVENTION

The present invention relates generally to aircraft gas turbine engines, and, more specifically, to vectoring exhaust nozzles therefor.

A typical high performance, augmented gas turbine engine includes a varying area converging-diverging exhaust nozzle which is axisymmetric about a longitudinal or axial centerline axis. The nozzle includes a plurality of circumferentially adjoining primary exhaust flaps joined in turn to a plurality of circumferentially adjoining secondary exhaust flaps. The secondary flaps are joined by corresponding outer compression links to a common stationary casing also supporting the primary flaps.

This assembly is articulated in the manner of four-bar linkages to vary exhaust flow area, designated A8, at the nozzle throat between the primary and secondary flaps, and for varying the flow area of the nozzle outlet, designated A9, at the downstream end of the secondary flaps. Suitable linear actuators such as hydraulic actuators are circumferentially spaced apart around the casing and have respective output rods joined to the nozzle for pivoting the primary flaps to control the throat area and in turn control the outlet-to-throat area ratio.

In order to increase the maneuverability of aircraft powered by augmented gas turbine engines, vectoring exhaust nozzles are being developed. In U.S. Pat. No. 4,994,660, assigned to the present assignee, an Axisymmetric Vectoring Exhaust Nozzle (AVEN®) is disclosed. In this type of nozzle, a primary actuation ring surrounds corresponding cams on the outboard surfaces of the primary flaps and is operatively joined to a plurality of primary linear actuators which control its axial position perpendicular to the axial centerline axis of the nozzle. The outer links in this nozzle are joined to a secondary actuation ring which in turn is joined to a plurality of secondary linear actuators mounted to the casing.

During operation, axial translation or slide of the primary ring controls the pivoting of the primary flaps and in turn the nozzle throat area. The secondary ring may also slide axially to independently control pivoting of the secondary flaps, and in turn control both the outlet area and the area ratio. Furthermore, the secondary ring may be tilted in space to effect pitch or yaw, or both, in the secondary flaps to effect nozzle vectoring in which the engine exhaust is discharged at a slight angle from the engine centerline axis as opposed to coaxially therewith as in conventional non-vectoring exhaust nozzles.

Since the secondary flaps are vectorable they substantially increase the complexity of the nozzle design and its implementation. For this reason, many additional patents have been granted on various features of the AVEN® exhaust nozzle in behalf of the present assignee. These patents relate to both the mechanical details of the nozzle and the control systems therefor.

Since a plurality of circumferentially adjoining secondary flaps are utilized in the nozzle, suitable inter-flap seals must also be provided for preventing flow leakage between the flaps as the flaps are positioned through a suitable range of vectoring. This range, however, is limited to avoid inter-flap flow leakage or undesirable distortion of the various components.

Furthermore, the control system for the vectorable nozzle is being developed for a digitally programmable controller to control the actuators in feedback closed loops. The nozzle controller typically includes limiting values to prevent excess vectoring of the nozzle within the mechanical capabilities of the nozzle components. And, the nozzle controller must be sufficiently fast to process the required data in real time for the extremely fast maneuvering of the nozzle and the aircraft being powered therewith.

The complexity of the nozzle is further increased by using more than three actuators for the secondary actuation ring to provide redundancy. Redundant hardware requires precise control of the fourth or more actuators to prevent opposition with the initial three actuators which define the plane of the secondary ring. In some designs, it may be desirable to employ two redundant secondary actuator systems, with each system having three actuators. The six actuators must therefore be controlled in unison to prevent opposition load therebetween and to ensure that all the actuators operate synchronously.

Synchronous operation of the many actuators is yet further complicated in view of the redundant position sensors or detectors incorporated therein. Typical feedback control requires the measurement of output stroke of the individual actuators which is compared in the controller with the corresponding demand signal therefor, with the difference between the demand and measured strokes being driven to a minimum or zero value in a closed loop. Accurate feedback measurement is therefore important to the coordinated operation of the several actuators.

More specifically, considerable expense and initial calibration is required in the manufacture of the individual actuators to ensure that the redundant position detectors therein not only provide equal output with each other, but equal output with the cooperating actuators controlling thrust vectoring. A typical position detector is in the form of a Linear Variable Differential Transformer (LVDT) which typically includes an elongate coil having an output voltage which varies linearly in response to the axial stroke of the output rod of the actuator. During initial manufacture, therefore, the LVDTs must be carefully aligned in the individual actuators for obtaining equal linear response therefrom between minimum and maximum values during operation.

Furthermore, significant time and expense is also required to assemble the individual actuators to the corresponding vectoring ring for initially positioning the ring square or perpendicular to the centerline axis of the nozzle so that pure axial slide of the ring, and tilting thereof for effecting both pitch yaw of the ring may be accurately obtained by the coordinated stroke of the individual actuators joined thereto.

The precision manufacture and assembly of the several secondary actuators attached to the secondary actuation ring is required in view of the predetermined and fixed control algorithms stored in the nozzle controller which controls operation of the nozzle. Variations in initial calibration of the LVDTs in the several actuators, and variations in assembly of the actuators with the secondary actuation ring will therefore effect variations in performance of the vectoring nozzle which is difficult, if not impossible, to correct in the controller itself.

Accordingly, it is desired to provide an improved control system for the vectoring actuators in an exhaust nozzle which automatically calibrates for uncalibrated or miscalibrated actuators in the assembled nozzle actuation system.

SUMMARY OF THE INVENTION

A method and system are used to calibrate a plurality of actuators joined to an actuation ring in a control system for vectoring exhaust flaps in a vectoring nozzle. The actuators include output rods which are positioned to respective first positions at which output stroke is measured. The actuators are repositioned to different second positions, and the output stroke thereof is again measured. The stroke measurement for each of the actuators is calibrated to effect a common linear response between the first and second measurement positions. The calibrated actuators ensure coordinated linear actuation thereof as the output rods are positioned between their minimum and maximum extensions.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
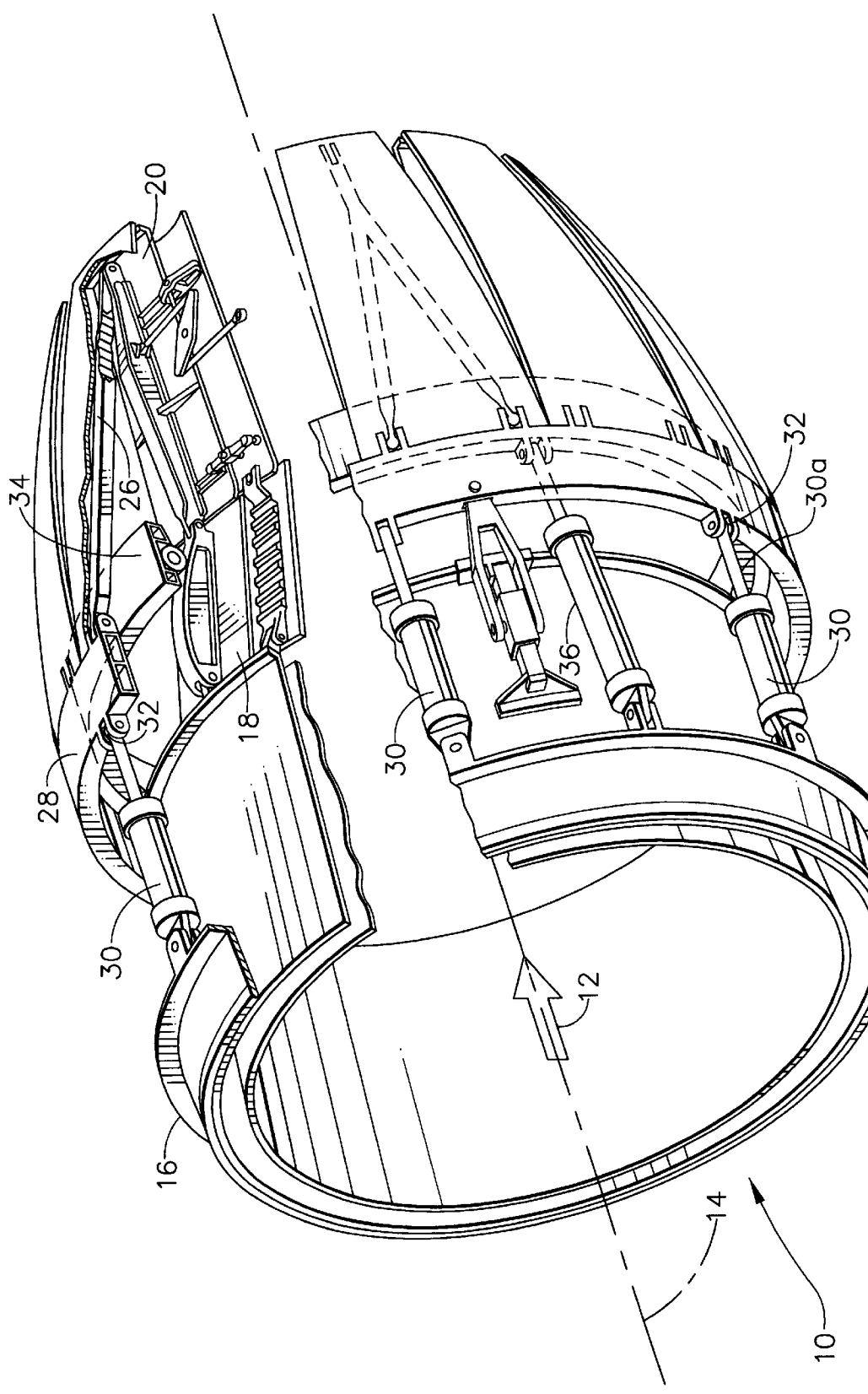
FIG. 1 is an isometric, partly sectional view of a gas turbine engine axisymmetric vectoring exhaust nozzle in accordance with an exemplary embodiment of the present invention.
Figure 2:
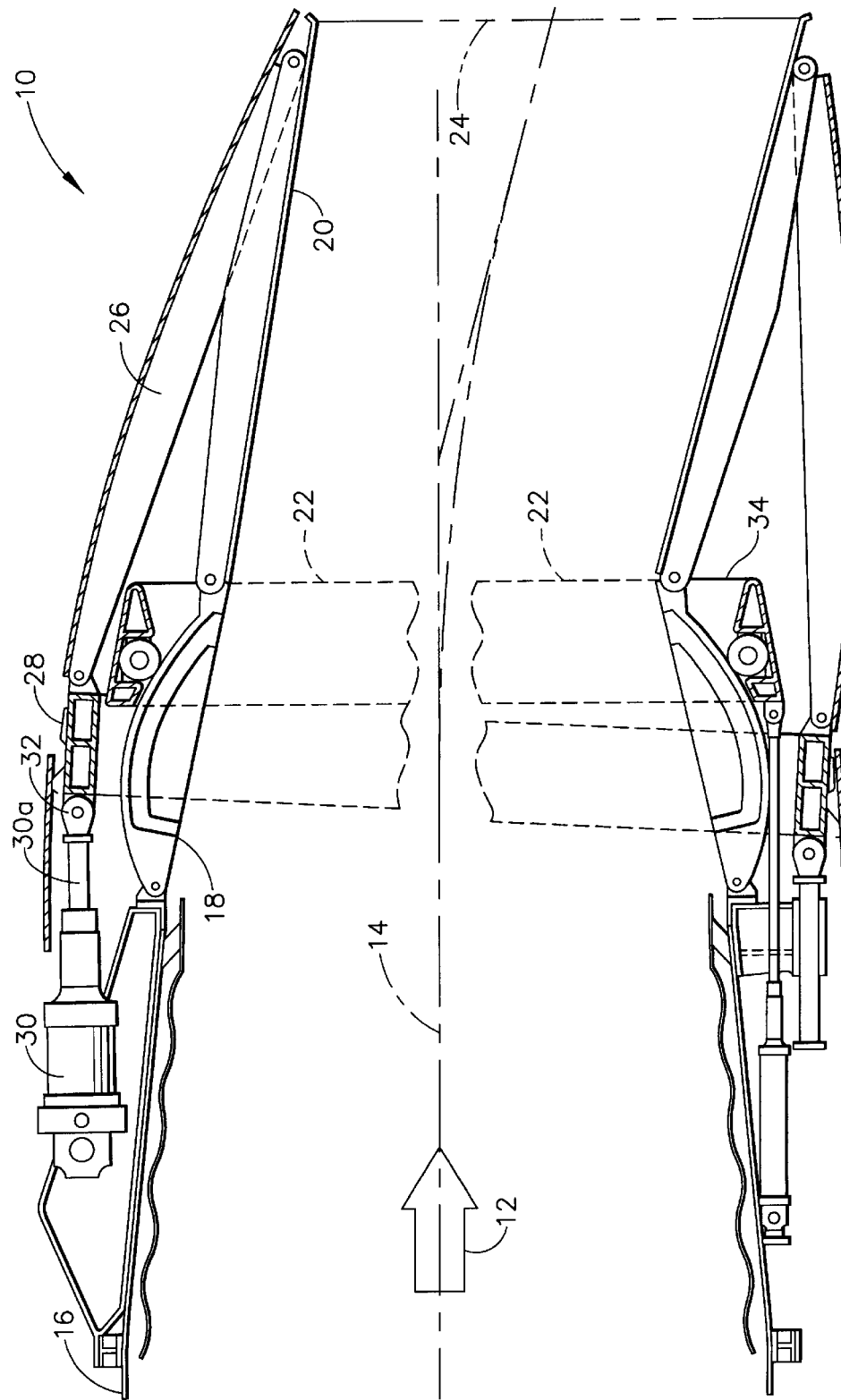
FIG. 2 is an elevational partly sectional view of the exhaust nozzle illustrated in FIG. 1 showing one of several secondary actuators joined to a secondary actuation ring for vectoring the exhaust nozzle.

Illustrated in FIGS. 1 and 2 is an exemplary axisymmetric vectoring exhaust nozzle 10 which receives combustion exhaust gases 12 from an augmented, turbofan gas turbine engine (not shown) to produce thrust for powering an aircraft (not shown) in flight. The nozzle 10 is axisymmetric about a longitudinal or axial centerline axis 14 and includes a fixed or stationary annular casing 16 which is suitably fixedly joined to the exhaust duct (not shown) of the gas turbine engine for receiving the exhaust 12 therefrom.

As best seen in FIG. 2, the nozzle 10 includes a plurality of circumferentially adjoining primary exhaust flaps 18 pivotally joined at forward ends thereof to the casing 16. A plurality of circumferentially adjoining secondary exhaust flaps 20 are pivotally joined at their forward ends to the aft ends of respective ones of the primary flaps 18 and define a throat 22 of minimum flow area, designated A8. The aft or downstream ends of the secondary flaps 20 define a nozzle outlet 24 having a flow area designated A9.

The aft ends of the secondary flaps 20 are pivotally joined to respective circumferentially spaced apart outer compression links 26 having forward ends pivotally joined to a common secondary actuation ring 28. At least three circumferentially spaced apart secondary actuators 30 are pivotally attached at respective joints 32 to the common secondary ring 28. The secondary actuators 30 are linear actuators, such as hydraulic actuators, having respective output rods 30a which may be selectively extended or retracted for correspondingly translating the secondary ring 28 at the respective joints 32.

Since the secondary flaps 20 are joined at their aft ends to the corresponding outer links 26 which in turn are joined to the secondary ring 28, translation of the secondary ring 28 may be used to control the flow area A9 of the outlet 24 and the corresponding outlet-to-throat area ratio A9/A8.

To control the flow area A8 of the throat 22, each of the primary flaps 18 has a corresponding cam on its outboard side that engages corresponding rollers mounted in a primary actuation ring 34 which surrounds the primary flaps 18. As shown in FIG. 1, a plurality of primary actuators 36, three for example, are pivotally joined at their forward ends to the casing 16, and have corresponding output rods pivotally joined to the primary ring 34.

Since the primary flaps 18 are pivotally joined at their forward ends to the casing 16, the pressure of the exhaust 12 during operation urges the primary flaps radially outwardly to engage the primary ring 34 which controls the size of the throat 22. By axially translating the primary ring 34 in the forward or aft direction, the cam profile on the backsides of the primary flaps 34 control the pivoting movement of the flaps and the corresponding area of the throat 22.

In this way, the primary and secondary flaps are independently controllable by their respective actuators and rings for controlling areas of the throat 22 and outlet 24, and the area ratio A9/A8 thereof. Furthermore, by also tilting the secondary ring 28, the secondary flaps 20 may be skewed or vectored relative to the centerline axis 14 for effecting thrust vectoring.

The above described exhaust nozzle 10 is generally conventional in configuration, except for certain details of the secondary actuators 30 which drive the secondary ring 28 and the control system therefor. Additional details of this nozzle may be found in U.S. Pat. No. 4,994,660 as introduced above in the Background section.

Figure 3:
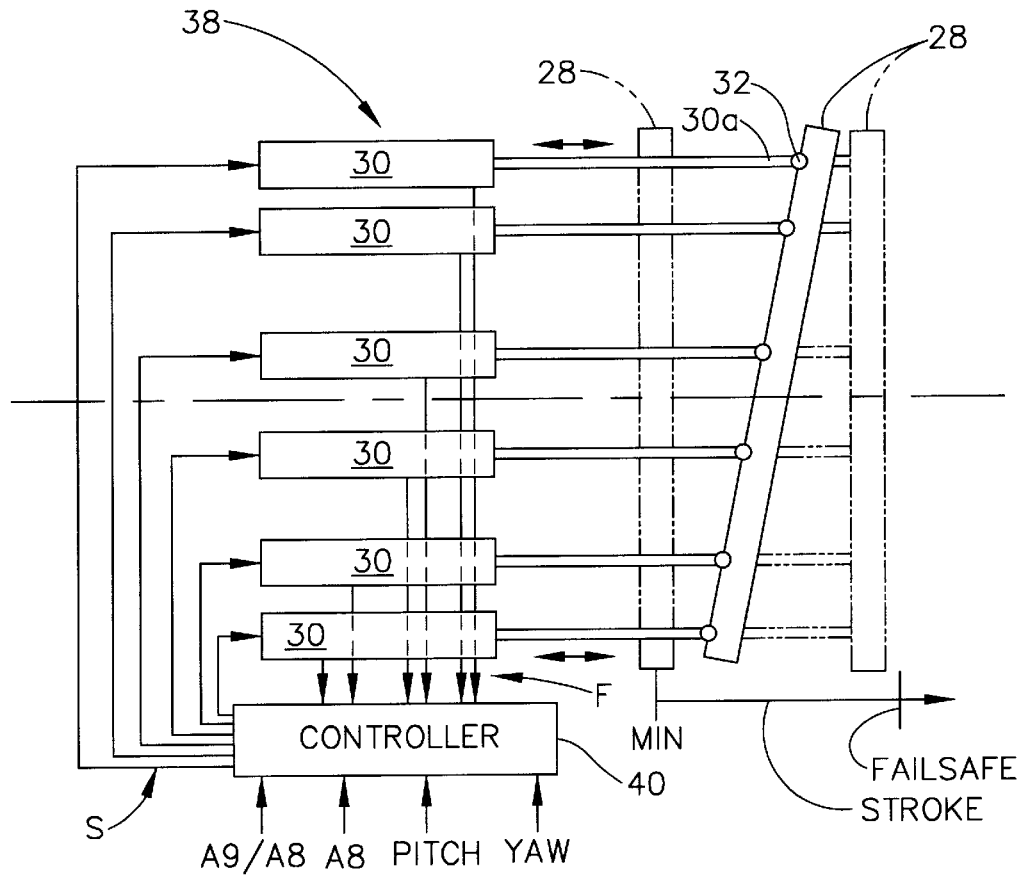
FIG. 3 is a schematic representation of two redundant three-actuator driving systems joined to the secondary actuation ring illustrated in FIGS. 1 and 2, and a control system therefor for driving the actuators in feedback closed loops.

Illustrated schematically in FIG. 3 is an improved control system 38 in accordance with an exemplary embodiment of the present invention for controlling stroke of the secondary actuators 30 attached to the secondary ring 28, which in turn is joined to the outer links 26 and secondary flaps 20, as illustrated in FIG. 2, for vectoring thrust in the exhaust nozzle.

In a preferred embodiment, two sets of three secondary actuators 30 are separately joined to the secondary ring 28 for providing redundant movement thereof, with all of the secondary actuators 30 requiring coordinated output strokes therebetween for preventing force-fight therebetween and undesirable stress or distortion in the secondary ring 28.

Coordinated movement of the secondary actuators 30, as well as the primary actuators 36, is effected in a nozzle controller 40 operatively joined to each of the actuators 30, 36 in typical feedback closed loops for independently controlling stroke of the several actuators in response to suitable command or demand signals. For example, FIG. 3 illustrates four typical control demands including the throat area A8, the area ratio A9/A8, pitch, and yaw. As indicated above, axial position of the primary ring 34 controls the throat area A8 by positioning the primary flaps 18. And, the axial and tilted position of the secondary ring 28 controls the area ratio A9/A8, pitch, and yaw by correspondingly positioning the secondary flaps 20.

The nozzle controller 40 is preferably in the form of a digitally programmable computer such as a Vector Electronic Control (VEC) processor which may be conventionally programmed with control algorithms or software for implementing the desired feedback control of the exhaust nozzle.

Figure 4:
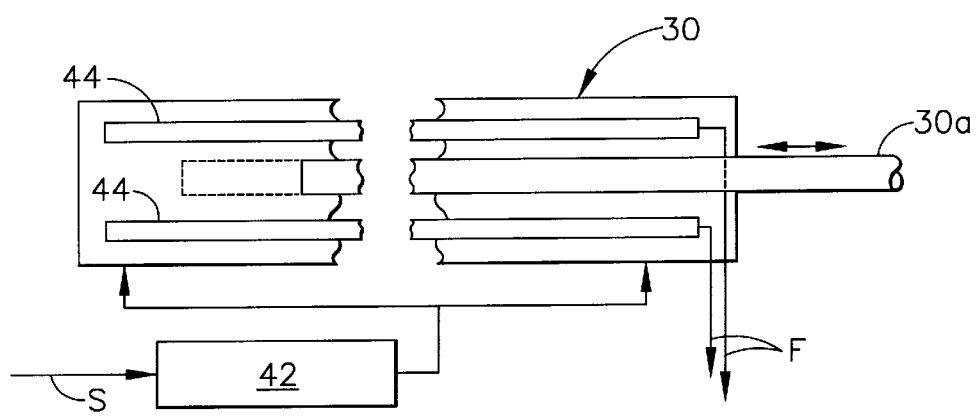
FIG. 4 is a schematic representation of one of the secondary actuators illustrated in FIG. 3 including a redundant pair of output position detectors.

A feedback control loop requires measurement of the stroke of the individual output rods 30a of the several secondary actuators 30. FIG. 4 illustrates in more particularity a representative one of the secondary actuators 30 including the output rod 30a thereof whose axial position is conventionally controlled hydraulically. A suitable hydraulic controller 42 is associated with each of the secondary actuators 30 for providing hydraulic fluid under pressure to position the output rod 30a between a minimum retracted position and a maximum extended position.

Each of the secondary actuators 30 as illustrated in FIG. 4 preferably includes a redundant pair of position detectors 44 for measuring stroke of the respective actuators 30 for use in the feedback control system. The detectors 44 are operatively joined by electrical leads to the nozzle controller 40 in feedback closed loops for independently controlling stroke of the actuators 30 in response to the command and measured feedback signals.

The individual secondary actuators 30 and position detectors 44 may take any conventional form such as a hydraulic linear actuator with Linear Variable Differential Transformer (LVDT) detectors 44. The LVDTs 44 are typically in the form of elongate coils electrically joined to the controller 40 and powered at a suitable voltage. The LVDTs 44 cooperate with the output rod 30a in each actuator so that extension or retraction of the output rod effects a corresponding output voltage from the detectors 44 which is linear in response to stroke of the output rod.

Typically, the minimum or fully retracted position of the output rod 30a produces a correspondingly minimum output voltage, and the fully extended or maximum position of the output rod produces a maximum output voltage, with intermediate positions therebetween following a linear, sloped response line therebetween. The output stroke of the actuators 30 may therefore be measured independently by the corresponding pair of detectors 44 which produce measured feedback signals F representative of the measured stroke of the output rods 30a.

The controller 40 provides a stroke command signal S for each of the secondary actuators 30 which is used in the respective hydraulic controllers 42 to position the output rods 30a in response thereto. In a feedback loop, the measured stroke F is compared with the command stroke S to produce a difference signal which is driven to a minimum or zero value when the output rod is properly positioned in response to the demand.

As indicated above, the individual secondary actuators 30 and the redundant position detectors 44 therein are conventional except that the detectors 44 need not be initially calibrated with precision as was previously done. The detectors 44 therefore may be provided uncalibrated for substantially reducing their cost. However, since the actuators 30 may use uncalibrated detectors 44 for reducing cost, the individual detectors 44 therein will most likely have different linear responses not only in each of the several secondary actuators 30, but also between each of the secondary actuators 30. For example, the six actuators 30 collectively have twelve detectors 44, with each detector 44 likely having a slightly different linear response as the respective output rods 30a are moved between their minimum and maximum positions.

Figure 5:
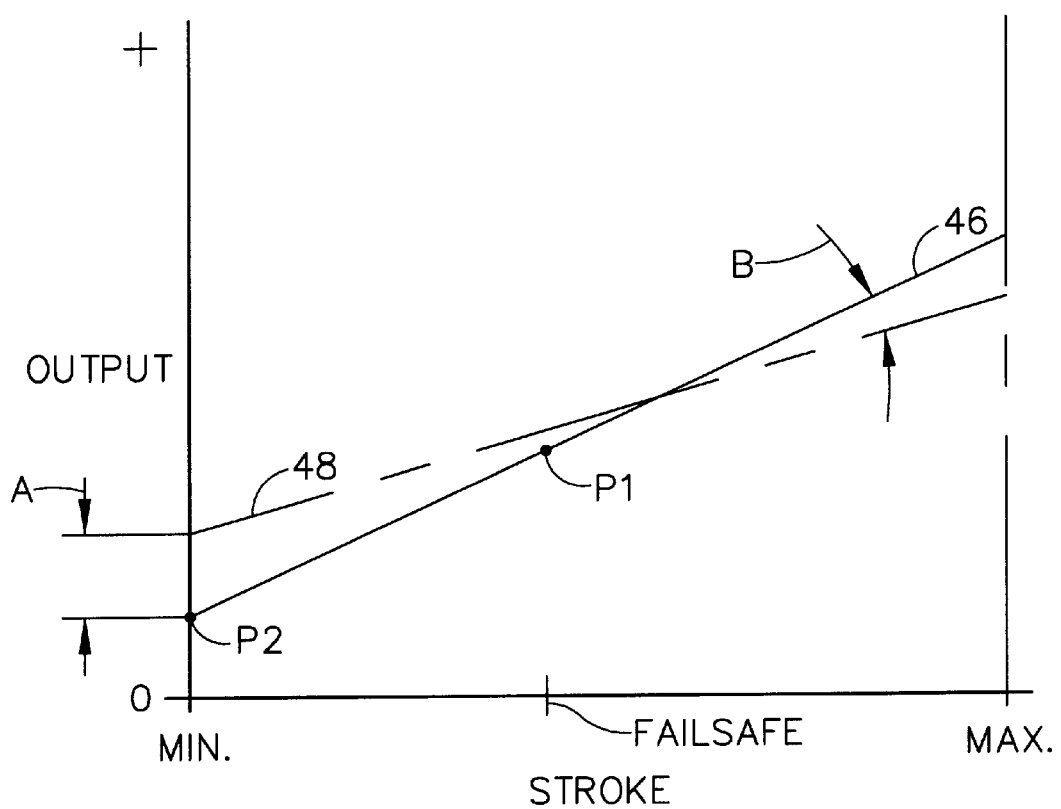
FIG. 5 is an exemplary graph plotting linear output response of the actuator position detectors in response to output rod stroke.

In accordance with the present invention, the nozzle controller 40 includes means for automatically calibrating the several detectors 44 at two positions of the output rods to effect a common linear response therebetween. More specifically, FIG. 5 illustrates an exemplary graph of the detectors 44 in which stroke of the output rods between the minimum and maximum positions thereof correspondingly produces minimum and maximum output signals expressed in volt/volt. In order to most effectively coordinate the output strokes of the several secondary actuators 30, it is preferred that the several detectors 44 therefor share a common linear response 46 represented by the solid straight line illustrated in FIG. 5 which slopes upwardly from a minimum output value at the minimum stroke position to a maximum output value at the maximum stroke position.

However, in view of the uncalibrated nature of the individual detectors 44, each detector 44 will most likely have a different uncalibrated linear response 48 represented by the phantom line illustrated in FIG. 5. The actual uncalibrated response 48 for each of the detectors 44 will vary randomly, but may be identified by an output offset constant A and a constant B representing the difference in slope from the common linear response 46.

The graph in FIG. 5 indicates that irrespective of the initial uncalibrated response 48 of the individual detectors 44, they may be simply calibrated to the common linear response 46, which may be any selected one of the detector responses, or an arbitrary common response thereof. Calibration of the stroke measurement for each of the secondary actuators 30 may be simply effected by providing offset and slope constants A, B for each of the detectors 44 to effect the common linear response 46.

The offset constant A may be chosen at any point in the stroke of the actuator to compensate for the difference in output signals from the detectors to provide substantially equal values at that point. The slope constant is selected to adjust the slope of the uncalibrated response 48 to match the slope of the common response 46 to ensure substantially equal output response for each detector for corresponding values of the stroke between minimum and maximum. In this way, the individual detectors 44 need not be mechanically calibrated during manufacture, but are instead calibrated electrically using suitable software in the nozzle controller.

Figure 6:
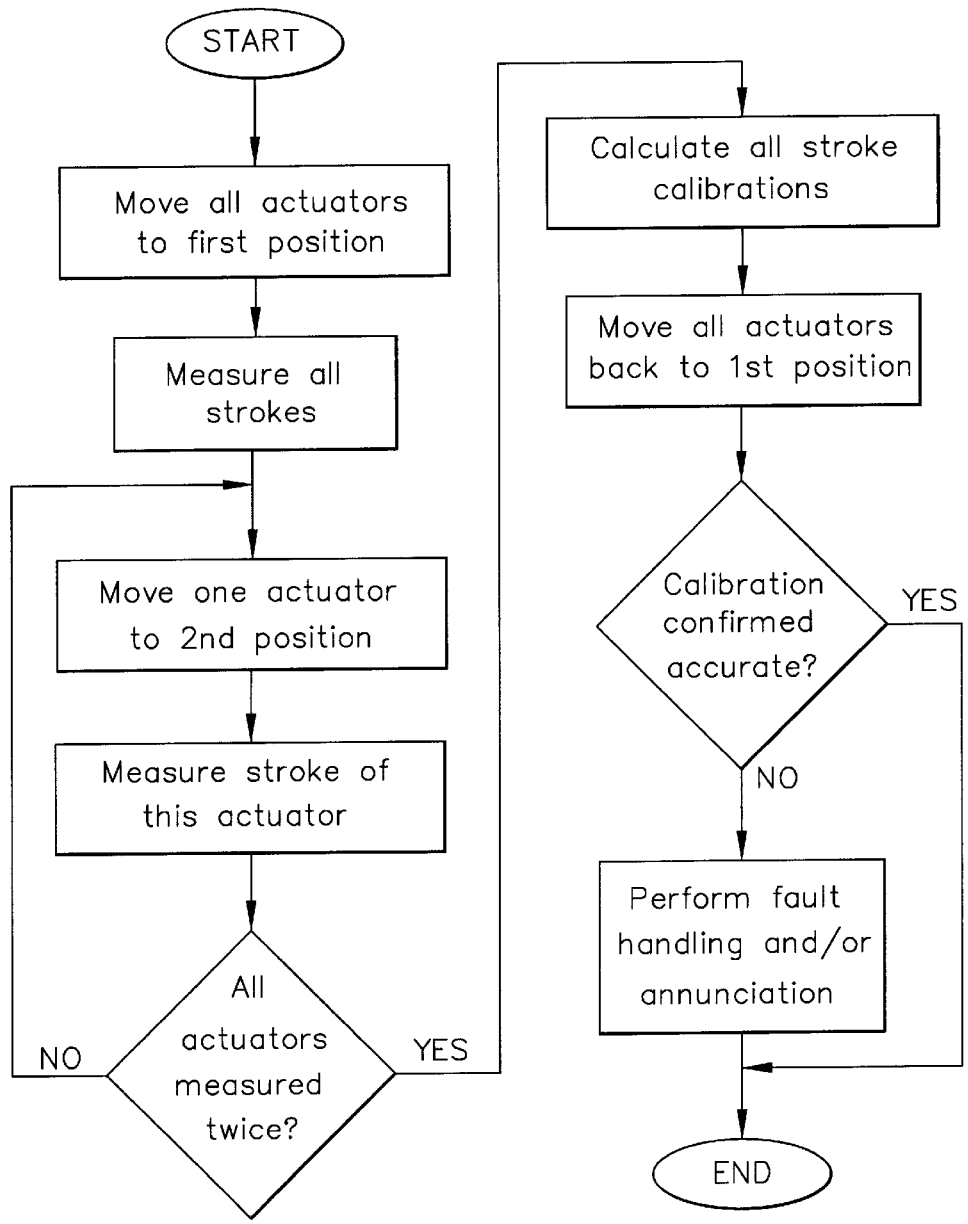
FIG. 6 is a flowchart of an exemplary method for calibrating the control system illustrated in FIG. 3 for obtaining common linear response of the actuators thereof shown in FIG. 5.

More specifically, the calibration process is illustrated in flowchart form in an exemplary embodiment in FIG. 6. For safety reasons, the calibration procedure should only be allowed when the aircraft is not in flight, the aircraft engine is not above idle power, and a suitable maintenance interlock has been activated. The calibration procedure may be effected before initial use of the exhaust nozzle, as well periodically when desired in the event of mechanical or temperature variations which affect nozzle control.

The procedure is initiated by positioning the output rods 30a of the secondary actuators 30 to respective first positions designated P1 in FIG. 5 which are intermediate the minimum and maximum extended positions, and preferably at a failsafe position. The failsafe position is one in which the output rods 30a automatically seek a nominal mid-stroke position in the event of various failure modes. In the failsafe position, the nozzle is not vectored but assumes a suitable position such as at cruise for obtaining nominal exhaust thrust for allowing continued operation of the aircraft in a conventional manner.

Measuring stroke of the secondary actuators 30 is then effected at the first positions by recording the feedback signals F in a suitable memory in the controller 40. The output rods 30a of the secondary actuators 30 are then positioned by driving the actuators to second positions P2 which are different than the respective first positions. The second positions P2 are shown in FIG. 5 as being preferably the minimum or fully retracted positions of the respective output rods. Although the different first and second positions P1 and P2 may be otherwise chosen, the failsafe first position P1 is preferred since this is the position of the output rods during the failsafe mode at which maximum accuracy is preferred.

At the respective second positions of the output rods, stroke of the secondary actuators 30 is again measured using the corresponding detectors 44, with the measured strokes F again being recorded in the controller memory.

From this two-point data for each of the secondary actuators 30, corresponding lines extending therebetween may be mathematically determined in the controller for calibrating or compensating the stroke measurement for each of the actuators 30 using the measured strokes at the first and second positions to effect a common linear response therebetween. As indicated above with respect to FIG. 5, by recording detector output at two different stroke positions, corresponding straight lines may be defined therebetween and the differences between the individual response lines and the common linear response 46 may be determined so that suitable offset and slope constants A, B may be calculated. The constants are then used to change the measured values of the feedback stroke F in the controller for following the common linear response 46 in each of the separate feedback loops.

Calibration is therefore effected by modifying the measured strokes F regardless of the lack of uniformity of the original detectors 44. The so modified measured stroke F in practice is no different than the signal which would have been obtained from an initially calibrated detector 44, but with a significant simplification in actuator fabrication. Furthermore, calibration of the control system may be effected whenever desired simply and automatically by repeating the calibration process, which heretofore has not been possible.

In the preferred embodiment of the calibration procedure illustrated in FIG. 6, after the actuators are moved to their respective first and second positions and the stroke measured threat for determining the required calibration therefor, the actuators are again positioned with their output rods at the initial or first failsafe position. The stroke of the several actuators 30 is again measured at the first positions to verify the common linear response of the several detectors which should produce substantially identical output values. The calibration procedure may be further verified by positioning the respective output rods 30a again to the second, minimum positions and measuring again the stroke thereat, which should be substantially equal for an effectively calibrated system.

As indicated above, the measuring steps are preferably effected using respective linear position detectors 44 each having an output response which is substantially linear with the actuator stroke. In this way, each actuator rod may be simply repositioned at two positions for measuring the output strokes thereof, with two points being the minimum for defining the respective response lines. By introducing the calibration offset and slope constants A, B associated with each detector 44, substantially equal linear response for each of the detectors may be obtained in the controller 40 and used in the feedback control algorithms for controlling the respective secondary actuators 30.

Since each secondary actuator 30 preferably includes a redundant pair of the detectors 44 therein, the stroke for each of the actuators is redundantly measured using each detector at both the first and second positions. Corresponding offset and slope constants for the two detectors of each secondary actuator 30 are calculated in the controller 40 for calibrating the redundant stroke measurement for each actuator for substantially equal linear response. The linear response for the two detectors in each secondary actuator 30 should be equal to avoid error indications in the controller which would place the nozzle in the failsafe mode of operation.

Equal linear response between each of the several secondary actuators 30 is also preferred to prevent force-fights therebetween and any associated stress or distortion in the secondary ring therefrom. Since three secondary actuators 30 are used in each redundant drive system, inaccuracy in measured position of the actuators would merely create inaccuracy in position of the secondary ring 28. However, inaccuracy in measured stroke between actuators of the redundant systems is joined to the secondary ring 28 will cause force-fights therebetween since three points define a plane, and four or more points represented by the redundant actuation systems must accurately follow the first system to maintain single plane movement of the secondary ring 28.

Since the several secondary actuators 30 are interconnected by the secondary ring 28, they may be moved in unison between the first and second positions during the calibration procedure if the geometry of the nozzle so permits. However, in a preferred embodiment, all the output rods 30a may be simultaneously moved to the first, failsafe position, from which the individual output rods 30a are separately positioned to the corresponding second, minimum positions in turn, and then displaced therefrom. This will allow the individual output rods 30a to travel between the desired first and second positions for calibration without exceeding the motion capabilities of the secondary flaps 20 and corresponding inter-flap seals therebetween.

Also in the preferred embodiment, the individual output rods 30a are retracted to their minimum positions in turn, with the remaining ones of the output rods 30a being suitably positioned to permit unrestrained movement of the output rod being retracted to its minimum position.

The sequential movement of the individual output rods 30a between their first and second calibrating positions is accomplished in turn for each of the three actuators in the separate, redundant systems. As each redundant system is calibrated, the other redundant system may be placed in a conventional bypass mode of operation which allows their output rods to be carried without restraint by the moving secondary ring 28.

A significant advantage of the present invention is that the control system may be otherwise identical to the original control system except that noncalibrated secondary actuators 30 may now be used, with a corresponding change in the control algorithms of the controller 40 for effecting automated calibration electrically for use in the standard feedback closed loops. Relatively simple correction or calibration constants for each of the detectors 44 may be readily stored in the controller memory and used in the control algorithms for obtaining substantially equal linear response of the several detectors 44 irrespective of their initial calibration or lack thereof. The vectoring nozzle 10 may therefore be calibrated with a substantial reduction in time, with reduced operator intervention, and without undesirable stress and distortion of the interconnected components of the vectoring system due to lack of coordination therebetween.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

1. A method of calibrating a plurality of actuators joined to an actuation ring in a control system for vectoring exhaust flaps in a vectoring nozzle, comprising:

positioning output rods of said actuators to respective first positions;

measuring stroke of said actuators at said first positions;

positioning said output rods to respective second positions different than said first positions;

measuring stroke of said actuators at said second position; and calibrating said stroke measurement for each of said actuators to effect a common linear response therebetween.

2. A method according to claim 1 further comprising:

positioning again said output rods to said first positions;

measuring again said stroke of said actuators at said first positions; and verifying said common linear response.

3. A method according to claim 2 wherein said measuring steps are effected using respective position detectors each having an output response being substantially linear with said actuator stroke.

4. A method according to claim 3 further comprising:

redundantly measuring stroke for each of said actuators at said first and second positions; and calibrating said redundant stroke measurement for each of said actuators for substantially equal linear responses.

5. A method according to claim 4 wherein said calibration includes offset and slope constants for each of said detectors to effect said common linear response.

6. A method according to claim 2 wherein said output rods are positioned to said second positions in turn, and then displaced therefrom.

7. A method according to claim 2 wherein:

said first positions are failsafe positions between a minimum retracted position and a maximum extended position of said output rods; and said second positions are said minimum positions.

8. A method according to claim 7 wherein:

said output rods are retracted to said minimum positions in turn; and remaining ones of said output rods are positioned to permit unobstructed movement of said retracted output rod to said minimum position.

9. A control system for controlling stroke of a plurality of circumferentially spaced apart actuators having output rods attached to an actuation ring positionable to vector thrust in a gas turbine engine exhaust nozzle comprising:

a plurality of position detectors for measuring stroke of said actuators;

a controller operatively joined to said actuators and detectors in feedback closed loops for independently controlling stroke of said actuators;

said detectors being uncalibrated, and having different responses for said actuators between different first and second positions of said output rods; and said controller including means for calibrating said detectors between said first and second positions to effect a common linear response therebetween.

10. A system according to claim 9 wherein said calibrating means include offset and slope constants for each of said detectors to effect said common linear response.

11. A system according to claim 10 wherein:

each of said actuators includes a redundant pair of said detectors therein; and said offset and slope constants for each pair of said redundant detectors calibrate said detectors to effect substantially equal linear response therefrom.

* * * * *